US007412906B2

(12) United States Patent
Ponziani

(10) Patent No.: US 7,412,906 B2
(45) Date of Patent: Aug. 19, 2008

(54) STEERING SYSTEM TORQUE SENSOR

(75) Inventor: Richard Louis Ponziani, Centerville, OH (US)

(73) Assignee: Globe Motors, Inc., Dayton, OH (US)

( * ) Notice: Subject to any disclaimer, the term of this patent is extended or adjusted under 35 U.S.C. 154(b) by 134 days.

(21) Appl. No.: 11/478,426

(22) Filed: Jun. 29, 2006

(65) Prior Publication Data
US 2007/0000716 A1 Jan. 4, 2007

Related U.S. Application Data

(60) Provisional application No. 60/695,491, filed on Jun. 30, 2005.

(51) Int. Cl.
*G01L 3/00* (2006.01)
(52) U.S. Cl. .............. 73/862.331; 73/862.08; 73/862.325; 73/862.333; 73/862.335; 180/443; 180/444
(58) Field of Classification Search .............. 73/862.08, 73/862.325, 862.331, 862.333, 862.335; 180/443, 444
See application file for complete search history.

(56) References Cited

U.S. PATENT DOCUMENTS

| 3,465,842 | A | 9/1969 | Hruska |
| 3,534,623 | A | 10/1970 | Goodacre et al. |
| 4,415,054 | A | 11/1983 | Drutchas |
| 4,582,155 | A | 4/1986 | Ohe |
| 4,598,787 | A | 7/1986 | Drutchas |
| RE32,222 | E | 8/1986 | Drutchas |
| 4,657,103 | A | 4/1987 | Shimizu |
| 4,660,671 | A | 4/1987 | Behr et al. |
| 4,676,331 | A | 6/1987 | Iwaki et al. |
| 4,681,182 | A | 7/1987 | Suzuki et al. |
| 4,715,461 | A | 12/1987 | Shimizu |
| 4,727,950 | A | 3/1988 | Shimizu et al. |
| 4,778,022 | A | 10/1988 | Kamiya |
| 4,784,002 | A * | 11/1988 | Io .................. 73/862.331 |
| 4,784,234 | A | 11/1988 | Naito et al. |
| 4,800,974 | A | 1/1989 | Wand et al. |
| 4,828,066 | A | 5/1989 | Hayashi |

(Continued)

FOREIGN PATENT DOCUMENTS

WO    WO 95/33982 A1    12/1995

*Primary Examiner*—Edward Lefkowitz
*Assistant Examiner*—Freddie Kirkland, III
(74) *Attorney, Agent, or Firm*—Stevens & Showalter LLP

(57) ABSTRACT

A sensor apparatus for a power steering system on a vehicle, where the apparatus includes an input shaft for receiving a steering input and for rotating about a rotational axis. An output shaft is provided for transmitting the steering input from the input shaft to a steered wheel assembly of the vehicle. A torque transmitting member connects between the input shaft and the output shaft for transmitting a torque from the input shaft to the output shaft. A sensor provides an analog output voltage in response to a sensed magnetic field. A magnet is located adjacent and in radially spaced relation to the sensor, and a magnetic field varying member is positioned in a magnetic field of the magnet, where the magnetic field varying member is movable in a longitudinal direction generally parallel to the rotational axis to vary a magnetic flux between the magnet and the sensor in response to relative movement between the input shaft and the output shaft.

19 Claims, 4 Drawing Sheets

U.S. PATENT DOCUMENTS

| | | | |
|---|---|---|---|
| 4,862,982 A | 9/1989 | Saito et al. | |
| 4,898,258 A | 2/1990 | Ohe et al. | |
| 4,926,960 A | 5/1990 | Ishikura et al. | |
| 4,967,858 A | 11/1990 | Kotake et al. | |
| 4,984,474 A * | 1/1991 | Matsushima et al. | ... 73/862.325 |
| 5,010,970 A | 4/1991 | Yamamoto | |
| 5,020,616 A | 6/1991 | Yagi et al. | |
| 6,000,491 A | 12/1999 | Shimizu et al. | |
| 6,131,693 A | 10/2000 | Mukai et al. | |
| 6,227,060 B1 | 5/2001 | Nicot et al. | |
| 6,354,396 B1 | 3/2002 | Horton et al. | |
| 6,360,841 B1 | 3/2002 | Blandino et al. | |
| 6,364,050 B1 | 4/2002 | Horton | |
| 6,367,337 B1 * | 4/2002 | Schlabach | ............. 73/862.331 |
| 6,370,968 B1 | 4/2002 | Yasui | |
| 6,382,034 B1 | 5/2002 | Yasui et al. | |
| 6,422,336 B1 | 7/2002 | Abele et al. | |
| 6,456,913 B1 | 9/2002 | Nicot et al. | |
| 6,488,115 B1 | 12/2002 | Ozsoylu et al. | |
| 6,655,493 B2 | 12/2003 | Menjak et al. | |
| 6,705,423 B2 | 3/2004 | Ozsoylu et al. | |
| 6,708,794 B2 | 3/2004 | Menjak et al. | |
| 6,729,433 B2 | 5/2004 | Uryu et al. | |
| 6,833,697 B2 | 12/2004 | Van Ostrand et al. | |
| 6,845,309 B2 | 1/2005 | Recker et al. | |
| 6,847,902 B2 | 1/2005 | Fukaya et al. | |
| 6,854,556 B1 | 2/2005 | Yamamoto et al. | |
| 6,856,872 B2 | 2/2005 | Hironaka et al. | |
| 6,868,744 B2 * | 3/2005 | Sugimura et al. | ........ 73/862.33 |
| 6,874,595 B2 | 4/2005 | Mukai et al. | |
| 6,876,911 B2 | 4/2005 | Chen | |
| 6,988,422 B2 * | 1/2006 | Sugimura et al. | ...... 73/862.334 |
| 7,089,809 B2 * | 8/2006 | Nakane et al. | ......... 73/862.331 |
| 7,110,902 B2 * | 9/2006 | Fukaya et al. | ................. 702/99 |
| 7,246,531 B2 * | 7/2007 | Nakane et al. | ......... 73/862.332 |
| 2002/0157481 A1 | 10/2002 | Kogiso et al. | |
| 2002/0189371 A1 * | 12/2002 | Nakane et al. | ......... 73/862.333 |
| 2003/0062215 A1 | 4/2003 | Yasuda | |
| 2003/0155627 A1 * | 8/2003 | Fukuya et al. | ............... 257/467 |
| 2003/0167857 A1 * | 9/2003 | Sugimura et al. | ...... 73/862.333 |
| 2003/0200018 A1 | 10/2003 | Arimura | |
| 2003/0230449 A1 | 12/2003 | Nelson et al. | |
| 2004/0011138 A1 | 1/2004 | Gandel et al. | |
| 2004/0050616 A1 | 3/2004 | Thornburg | |
| 2004/0056748 A1 | 3/2004 | Masaki et al. | |
| 2004/0159488 A1 | 8/2004 | Matsumoto et al. | |
| 2005/0241414 A1 * | 11/2005 | Nakane et al. | ......... 73/862.333 |
| 2006/0156834 A1 * | 7/2006 | Tokumoto et al. | ...... 73/862.331 |

* cited by examiner

STEERING SYSTEM TORQUE SENSOR

CROSS-REFERENCE TO RELATED APPLICATIONS

This application claims the benefit of U.S. Provisional Application No. 60/695,491, filed Jun. 30, 2005, which is incorporated herein by reference.

BACKGROUND OF THE INVENTION

1. Field of the Invention

The present invention relates to a steering apparatus for use in a vehicle steering system and, more particularly, to a torque sensor for use in a vehicle steering system.

2. Description of Related Art

In known power steering systems an input force from a manually operated steering wheel for turning steered wheels of a vehicle may be assisted by an input from a motor driver. In such a steering system, it is known to provide a sensor for sensing a torque input from the steering wheel, where the sensed torque is provided as an input signal for a controller controlling the motor driver. The input provided by the motor driver may be controlled so as to provide a predetermined steering assist for a given level of input torque from the steering wheel.

Various constructions have been proposed for providing a measurement of the sensed torque input to the steering wheel. In a common sensing application, a relative movement between an input shaft and an output shaft is sensed. In particular, the input and output shafts may be connected by an elastically deformable member having predetermined torsional characteristics that permit relative rotation between the input and output shafts, where the relative rotation of the input and output shafts is indicative of the torque input.

U.S. Patent Application Publication No. 2004/0011138 A1 discloses a sensor for sensing a steering column torsion in which a programmable Hall effect sensor may be mounted in an air gap defined by two ferromagnetic collectors forming a structure for rotating relative to a structure provided with a plurality of magnets to provide a magnetic flux variation indicative of an applied torque, as sensed by the Hall effect sensor.

U.S. Patent Application Publication No. 2003/0062215 A1 discloses a power steering system including a sensor located between a ring shaped centrally located magnet and a magnetic body comprising a couple of magnetic yokes. The magnetic body changes a magnetic flux density of a magnetic circuit when a relative position between the magnetic body and the permanent magnet is changed by a torque applied to a steering shaft.

There continues to be a need for a torque sensing element capable of providing an accurate indication of a torque applied to a steering wheel of a vehicle, and which can provide an indication of applied torque independently of a rotational position of the steering wheel.

SUMMARY OF THE INVENTION

In accordance with one aspect of the invention, a sensor apparatus is provided for use in a steering system on a vehicle, where the apparatus comprises an input shaft for receiving a steering input and for rotating about a rotational axis. An output shaft is provided for transmitting the steering input from the input shaft to a steered wheel assembly of the vehicle. A torque transmitting member connects between the input shaft and the output shaft for transmitting a torque from the input shaft to the output shaft. A sensor provides an analog output voltage in response to a sensed magnetic field. A magnet is located adjacent and in radially spaced relation to the sensor, and a magnetic field varying member is positioned in a magnetic field of the magnet, where the magnetic field varying member is movable in a longitudinal direction generally parallel to the rotational axis to vary a magnetic flux between the magnet and the sensor in response to relative movement between the input shaft and the output shaft.

In accordance with another aspect of the invention, a sensor apparatus is provided for use in a steering system on a vehicle, where the vehicle comprises an input shaft for receiving a steering input and rotating about a rotational axis. An output shaft is provided for transmitting the steering input from the input shaft to a steered wheel assembly of a vehicle, the output shaft being rotationally movable relative to the input shaft. A torque transmitting member connects between the input shaft and the output shaft for transmitting a torque from the input shaft to the output shaft. A sensor provides an analog output voltage in response to a sensed magnetic field. A magnet is located adjacent and in radially spaced relation to the sensor, the magnet being mounted in stationary relationship to the sensor. A magnetic field varying member is positioned in a magnetic field of the magnet, where the magnetic field varying member is movable relative to the sensor and the magnet in a longitudinal direction generally parallel to the rotational axis to vary a magnetic flux between the magnet and the sensor in response to relative movement between the input shaft and the output shaft.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
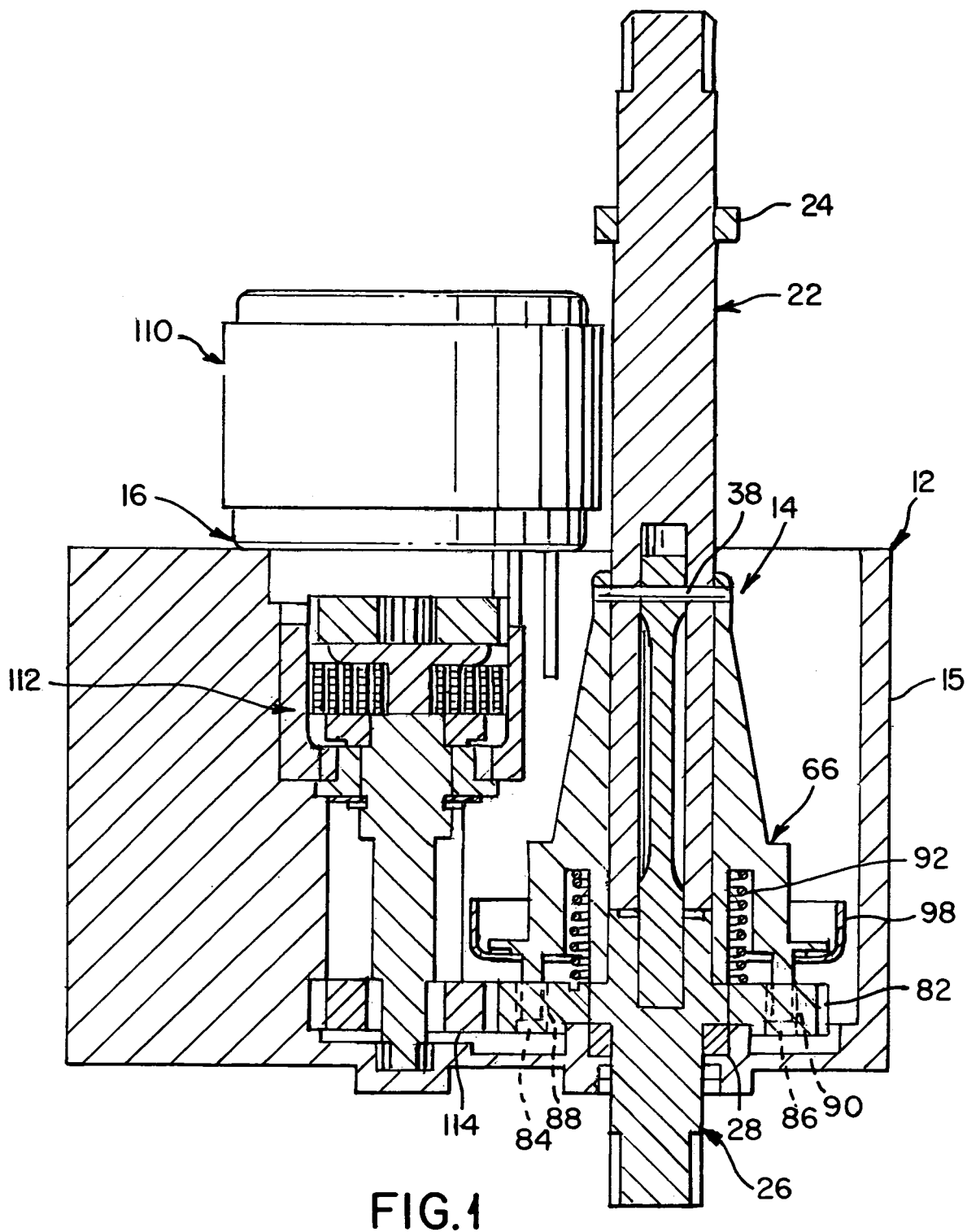
FIG. 1 is a partially cut-away view of a power steering system in accordance with the present invention.

Referring to FIG. 1, a power steering system 10 is illustrated including a casing 12, a torque shaft assembly 14 and a drive assist assembly 16. In addition, the system 10 includes a motor controller circuit board 18 and heat sink 20 (see FIGS. 6 and 7) which also form a part of a torque sensor for the system 10, as will be described further below.

Figure 2:
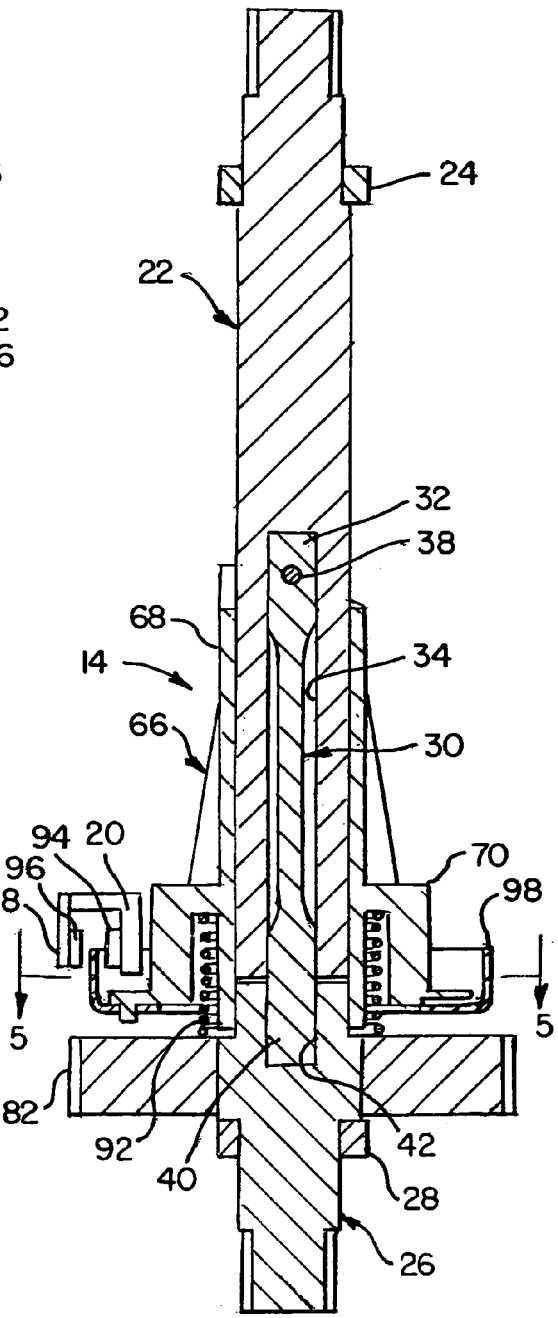
FIG. 2 is a cross-sectional view of the torque shaft assembly for the present invention.
Figure 3:
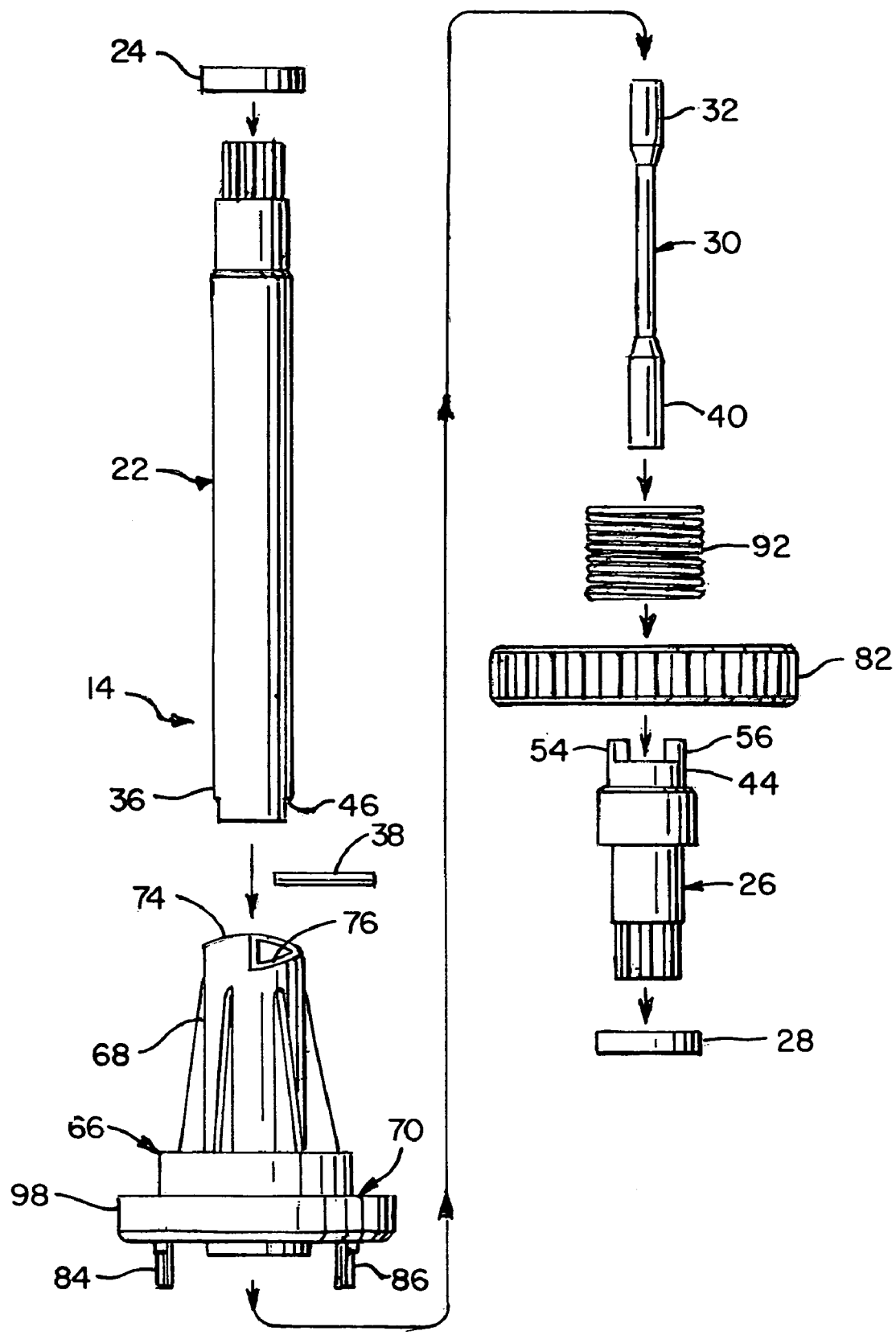
FIG. 3 is an exploded view of the torque shaft assembly for the present invention.

Referring to FIGS. 2 and 3, the torque shaft assembly 14 comprises an input shaft 22 supported at an upper end by a bushing 24, and an output shaft 26 coaxial with the input shaft 22 and supported at a lower end by a bushing 28. The bushing 24 may be mounted to an upper portion 13 of the casing 12, and the bushing 28 may be mounted to a lower portion 15 of the casing 12, see also FIG. 1. The input shaft 22 and output shaft 26 are connected to each other through an elastically deformable torsion bar 30 that may be formed of a spring steel. For example, without limitation, the torsion bar 30 may be formed of 4140 spring steel of approximately 40-60 Rc hardness or an equivalent material. The torsion bar 30 includes an upper end 32 that is located within an aperture 34 in a lower end 36 of the input shaft 22, and is held against rotation relative to the input shaft 22 by a transversely extending pin 38 passing through the input shaft 22 and the torsion bar 30, or by any other equivalent connection between the input shaft 22 and torsion bar 30. A lower end 40 of the torsion bar 30 is press fit within an aperture 42 in an upper end 44 of the output shaft 26, and is held against rotation relative to the output shaft 26 by frictional engagement between the surfaces of the lower end 40 and the aperture 42. It may be noted that the frictional force between the surfaces of the lower end 40 and the aperture 42 is greater than any torsional force that will be applied through the torsion bar 30.

Figure 5:
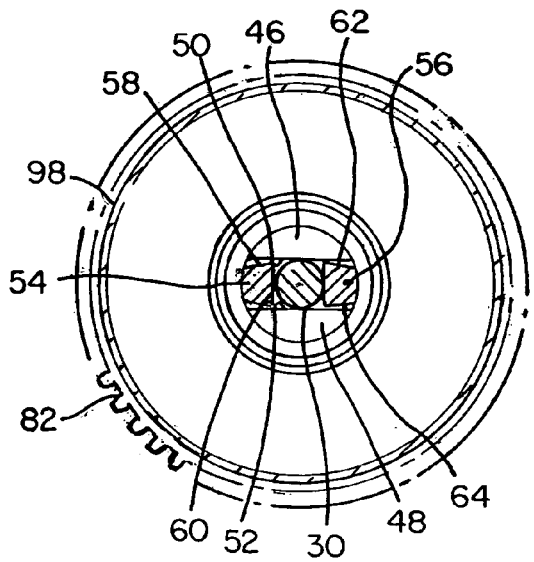
FIG. 5 is a cross-sectional view taken along line 5-5 in FIG. 2.

Referring further to FIG. 5, the lower end 36 of the input shaft includes a pair of spaced, crescent-shaped stop portions 46, 48, including respective stop surfaces 50, 52 located in facing relation to each other. The upper end 44 of the output shaft 26 includes a pair of spaced lug portions 54, 56 located between the stop surfaces 50, 52. The lug portion 54 includes a pair of opposing engagement faces 58, 60 facing toward the stop surfaces 50, 52. The lug portion 56 includes a pair of opposing engagement faces 62, 64 facing toward the stop surfaces 50, 52. The engagement faces 58, 64 will engage the stop surfaces 50, 52, respectively, when an input steering force, in a first direction, is applied to the input shaft 22 and causes the torsion bar 30 to twist a predetermined amount with an associated rotation of the input shaft 22 relative to the output shaft 26. Similarly, the engagement faces 60, 62 will engage the stop surfaces 52, 50, respectively, when an input steering force, in a second direction, is applied to the input shaft 22 and causes the torsion bar 30 to twist a predetermined amount with an associated rotation of the input shaft 22 relative to the output shaft 26. Further, the engagement faces 58, 60 and 62, 64 are preferably formed at an angle relative the stop surfaces 50, 52 such that the engagement faces 58, 60 and 62, 64 extend substantially parallel to adjacent stop surfaces 50, 52 when the torsion bar 30 has twisted the predetermined amount. In the illustrated embodiment, the predetermined amount of twisting of the torsion bar 30 and rotation of the input shaft 22 relative to the output shaft 26 is approximately 5°.

Figure 4:
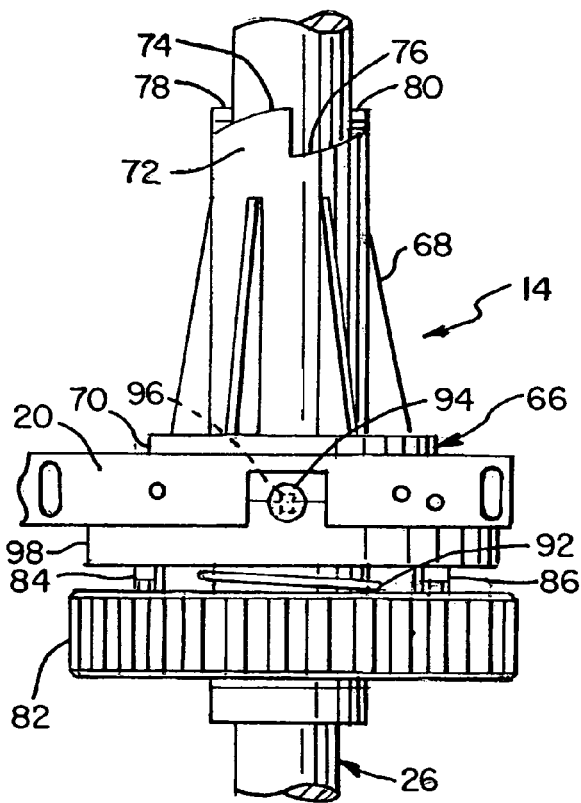
FIG. 4 is a top view of the torque shaft assembly.

Referring to FIGS. 2-4, the torque shaft assembly 14 further includes a collar member 66 located on the input shaft 22, and comprises a collar body 68 and a cup portion 70 attached to a proximal end of the body 68. A distal end 72 of the collar body 68 is formed with a pair of ramp portions 74, 76 defining camming surfaces. The transversely extending pin 38 includes opposing pin ends 78, 80 extending outwardly beyond the sides of the input shaft 22 to define cam follows engaged with the ramp portions 74, 76. The collar member 66 is slidably received over the input shaft 22 and is movable in an axial direction in response to the ramp portions 74, 76 moving relative to the pin ends 78, 80 with rotation of the collar member 66 relative to the input shaft 22, as described further below.

A driven gear 82 is rigidly attached to the output shaft 26, such as by a press fit of the driven gear 82 over the output shaft 26. The cup portion 70 of the collar member 66 includes a feature that maintains an alignment between the cup portion 70 and the gear/output assembly. An example of such a feature is a pair of fingers 84, 86 extending parallel to the axial direction of the input shaft 22. The fingers 84, 86 extend into respective passages 88, 90 in the driven gear 82, where the fingers 84, 86 are in sliding engagement in the passages 88, 90 and permit axial movement of the collar member 66 relative to the driven gear 82. A compression spring 92 is located between the driven gear 82 and the cup portion 70 of the collar member 66 to bias the ramp portions 74, 76 into positive engagement with the pin ends 78, 80. The finger members 84, 86 cause the collar member 66 to remain in a fixed rotational alignment relative to the output shaft 26 such that rotation of the input shaft 22 relative to the output shaft 26 produces a rotation of the collar member 66 relative to the input shaft 22. Accordingly, a relative rotation between the input shaft 22 and the output shaft 26 results in the ramp portions 74, 76 rotating relative to the pin ends 78, 80 to cause an axial movement of the collar member 66 along the input shaft 22.

Referring to FIG. 2, a magnet 94 is mounted to the heat sink 20 and a sensor 96 is mounted to the circuit board 18, where the magnet 94 and sensor 96 are maintained in fixed relation to each other and are substantially aligned with each other in a radial direction from the input shaft 22. A magnetic field is established between the magnet 94 and the sensor 96, where the sensor 96 is preferably capable of providing a substantially linearly varying output in response to a variation in the sensed magnetic field. For example, the sensor 96 may comprise a linear Hall effect sensor. The Hall sensor preferably comprises a ratiometric linear Hall effect sensor, such as a sensor model A1321 available from Allegro Microsystems, Inc. of Worcester, Mass.

The magnet 94 preferably comprises a magnet producing a strong magnetic field, such as a rare earth magnet. For example, the magnet 94 may comprise samarium cobalt magnet, where a single, relatively small magnet may produce a sufficiently strong magnetic field to be sensed by the sensor 96.

A magnetic field varying member comprising a ring 98 is mounted to the cup portion 70 of the collar member 66, and is located extending into the magnetic field between the magnet 94 and the sensor 96. Specifically, the ring 98 may comprise a thin, substantially uniform ring preferably formed of a magnetically soft alloy for affecting the magnetic field of the magnet 94. That is, the ring 98 may be formed of a material which is capable of being magnetized upon application of an external magnetic field, but which returns to a nonmagnetic condition when the field is removed. For example, the ring 98 may be formed of ferrous material such as a magnetic steel ring that is attached to and rotates with the collar member 66. In a preferred embodiment, the ring 98 may be formed of 1010 or 1018 steel, having a thickness in the range of 0.020-0.060 in. (0.5-1.5 mm), and is preferably approximately 0.040 in. (1.0 mm) thick, having substantially consistent magnetic properties around the circumference of the ring 98. The ring 98 is positioned within a gap between the magnet 94 and the sensor 96. The ring 98 is movable relative to the magnet 94 and sensor 96 in a circumferential direction and in an axial direction, where movement of the ring 98 in the circumferential direction, such as by simultaneous rotation of the input shaft 22 and output shaft 26 will not substantially alter the magnetic field between the magnet 94 and the sensor 96; and movement of the ring 98 in the axial direction, such as may be caused by rotation of the input shaft 22 relative to the output shaft 26, may result in a measurable change in the magnetic field.

The sensor 96 produces a linear voltage output, such as a voltage output varying in a range from 0 V to approximately 2.5 V, where a portion of the output range is used in providing a sensed output corresponding to an applied torque at the input shaft 22. For example, at a neutral, i.e., zero torque, position of the ring 98, the sensor 96 may output a voltage corresponding to a mid-range point of operation, such as approximately 1.3 V; and upon application of torque due to rotation of the input shaft 22, an output voltage of up to 2.5 V or down to 0 V may be produced. The voltage output by the sensor 96 will vary substantially linearly in proportion to the change in the magnetic field caused by the ring 98, where voltages above 1.3 V are indicative of torque applications by the input shaft 22 in a first direction, and voltages below 1.3 V are indicative of torque applications by the input shaft 22 in a second, opposite direction. That is, when a torque is applied by rotation of the first shaft 22 in the first direction, the collar member 66 and ring 98 will move in a direction toward the driven gear 82, moving the ring 98 into the magnetic field to increase the sensor voltage; and when a torque is applied by rotation of the first shaft 22 in the second direction, the collar member 66 and ring 98 will move in a direction away from the driven gear 82, moving the ring 98 out of the magnetic field to decrease the sensor voltage. It may be noted that the ramps 74, 76 are preferably engaged with the respective pin ends 78, 80 at approximately a mid-point along the ramps 74, 76 when no torque is being applied to the torsion bar 30, such that movement "up" or "down" the ramps 74, 76 is possible from the no torque position.

Figure 6:
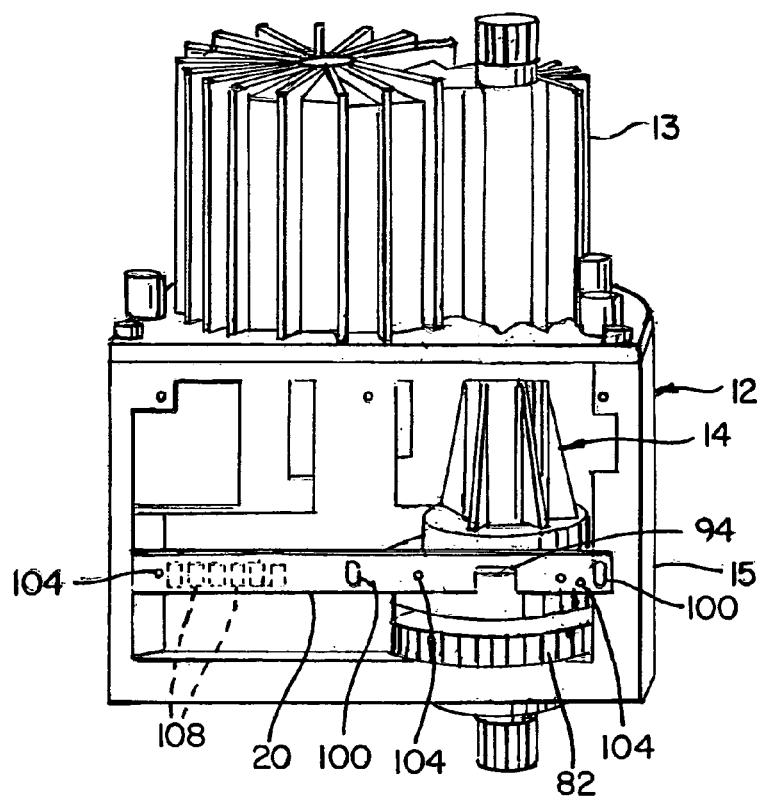
FIG. 6 is a top view of the power steering assembly with the circuit board removed.
Figure 7:
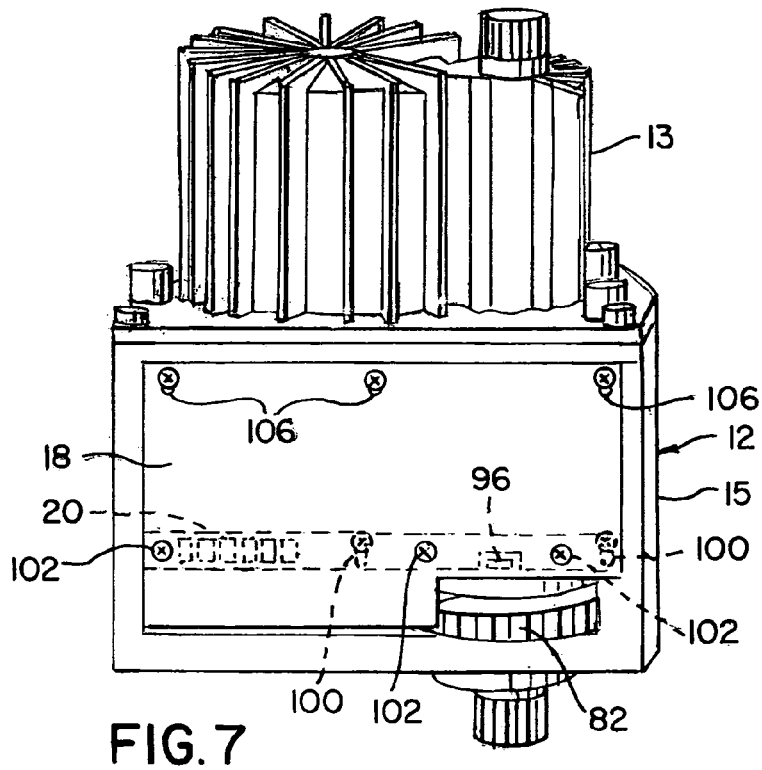
FIG. 7 is a top view of the power steering assembly with the circuit board positioned on the casing.

Referring to FIGS. 6 and 7, in order to ensure operation of the sensor 96 in the desired operating range upon assembly of the magnet 94 and sensor 96 into the casing 12, the heat sink 20 supporting the magnet 94 and circuit board 18 supporting the sensor 96 comprise a unit adjustable within the casing 12. Specifically, the heat sink 20 includes elongated mounting slots 100 for receiving fasteners engaging in the casing 12, such that the position of the heat sink 20 and associated magnet 94 may be adjusted in a direction parallel to the axis of the input shaft 22 to adjust the position of the magnet 94 relative to the edge of the ring 98. In addition, the circuit board 18 mates to the heat sink 20 in such a manner as to position the sensor 96 at a predetermined location relative to the magnet 94, including mounting holes and fasteners 102 (FIG. 7) for aligning with corresponding holes 104 (FIG. 6) in the heat sink 20 for joining the circuit board 18 and heat sink 20 together. In addition, the circuit board 18 includes elongated slots 106 for receiving fasteners engaged with the casing 12 and for accommodating adjustment of the circuit board 18 in the direction parallel to the axis of the input shaft 22, as determined by the adjusted position of the heat sink 20.

The circuit board 18 comprises a motor controller for receiving output signals from the sensor 96 and for producing motor control PWM signals corresponding to the sensor output signals for controlling operation of a plurality of FETs (field effect transistors) 108 mounted to the heat sink 20. The FETs 108 power a DC motor 110 (FIG. 1) of the drive assist assembly 16, where the motor may be either a brushless or brush DC motor. The motor 110 is connected to a planetary gear transmission 112 including an output drive gear 114 engaged with the driven gear 82. The axis of the motor 110 and transmission 112 extends parallel to the axis defined by the input shaft 22 and output shaft 26 to form a compact unit in which the planetary gear transmission 112 provides a space efficient gear reduction of approximately 10:1 in a limited space of the casing 12. The gear ratio provided between the drive gear 114 and the driven gear 82 provides a further gear reduction such that the overall speed reduction from the motor 110 to the driven gear 82 may be approximately 44:1.

When the input shaft 22 is turned in the first direction and torque is produced causing the torsion bar 30 to twist with relative movement between the input shaft 22 and output shaft 26, the ring 98 will move in the axial direction an amount relative to the magnet 94 and sensor 96 which is proportional to the torque, thereby causing a proportional change in the magnetic field sensed by the sensor 96. When the sensor 96 outputs a voltage indicative of a torque applied in the first direction, i.e., a voltage greater than 1.3 V, the motor 110 may be controlled to provide an assist for driving the driven gear 82 and associated output shaft 26 in the first direction, resulting in a reduction in the sensed torque. Similarly, when the input shaft 22 is turned in the second direction and torque is produced causing the torsion bar 30 to twist with relative movement between the input shaft 22 and output shaft 26, the ring 98 will move axially, in an opposite direction from that resulting from rotation in the first direction, thereby causing a proportional change in the magnetic field sensed by the sensor 96 and a corresponding change in the sensor voltage output, i.e., a reduction in the output to a voltage below 1.3 V. In response to the sensed voltage below 1.3 V, the motor 110 may be controlled to provide an assist for driving the driven gear 82 and associated output shaft 26 in the second direction, resulting in a reduction in the sensed torque.

It should be noted that the motor control for activating the motor 110 to provide an assist upon sensing a torque load may be programmed to not activate the assist until a predetermined torque load is sensed. For example, application of an assist from motor 110 may be activated only when a torque load of approximately 4 Nm or more is detected in either direction. Further, the presently described system is designed to permit a maximum torque of approximately 16 Nm to be transmitted through the torsion bar 30 before the lug portions 54, 56 engage with the stop portions 46, 48, i.e., at approximately 5° of rotation. Other values for the torque load and relative rotation between the input shaft 22 and output shaft 26 may be provided, and the present invention is not intended to be limited to any particular values provided herein for illustrative purposes.

During normal operating conditions, the supply voltage to the sensor 96 may vary, resulting in a variation in the signal or output voltage. In order to maintain a consistent output for any given rotational position of the ring 98, the motor controller circuit board 18 may monitor the voltage provided as a power input to the sensor 96 and compensate or adjust the output voltage received from the sensor 96 with reference to the supply voltage.

The magnetic flux of a rare earth magnet may vary with temperature. The sensor 96 is preferably selected such that it is temperature matched to the particular magnet 94 used in the system 10, such as a Hall sensor 96 that is temperature matched to a samarium cobalt magnet 94. That is, control circuitry in the sensor 96 controls the output of the sensor 96 to compensate for magnetic flux variations from the magnet 94 resulting from changes in the ambient temperature as well as to compensate for any temperature influenced variations occurring within the components of the sensor 96. Alternatively, a separate temperature sensor (not shown) may be located closely adjacent to the sensor 96 for detecting an ambient temperature in the sensing area of the sensor 96 and the magnet 94. An output of the thermistor may be provided to the motor controller circuit board 18 to adjust the sensed output of the sensor 96 to compensate for ambient temperature variations. For example, a table of temperature compensating factors may be stored on the motor controller circuit board 18 for adjusting the received output signal from the sensor 96 with reference to the temperature. The table may be empirically derived for a particular magnet 94 and sensor 96 combination to provide a consistent predetermined output value for each position of the ring 98 regardless of the ambient temperature. It should be understood that other temperature sensors may be used including, without limitation, a thermocouple for providing a temperature signal to the motor controller circuit board 18.

The above-described torque sensor may be incorporated in a vehicle steering system for providing a powered assist between a steering wheel and a steered wheel. For example, the compact form of the presently described system facilitates its utility in small tractors, including lawn and garden tractors. Without limitation, the present torque sensor may be incorporated in other vehicles including larger tractors and steered machinery, as well passenger vehicles and other torque sensing applications.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A sensor apparatus for use in a steering system on a vehicle, comprising:
   an input shaft for receiving a steering input and rotating about a rotational axis;
   an output shaft for transmitting the steering input from said input shaft to a steered wheel assembly of a vehicle;
   a torque transmitting member connected between said input shaft and said output shaft for transmitting a torque from said input shaft to said output shaft;
   a sensor providing an analog output voltage in response to a sensed magnetic field;
   a magnet located adjacent and in radially spaced relation to said sensor, said magnet being supported in stationary non-rotating and non-translating relation to said sensor; and
   a magnetic field varying member positioned in a magnetic field of said magnet between said magnet and said sensor, where said magnetic field varying member is movable to translate relative to said input shaft and said output shaft in a longitudinal direction generally parallel to said rotational axis to vary a magnetic flux between said magnet and said sensor in response to relative movement between said input shaft and said output shaft.

2. The apparatus of claim 1, wherein said output shaft is rotationally movable relative to said input shaft.

3. The apparatus of claim 1, wherein said magnetic field varying member moves relative to said sensor and said magnet to vary said magnetic flux.

4. The apparatus of claim 1, wherein said sensor generates said analog output voltage in proportion to said magnetic flux.

5. The apparatus of claim 1, wherein said sensor comprises a linear Hall sensor.

6. The apparatus of claim 5, wherein an output from said Hall sensor is adjusted with reference to an input voltage supplied to said Hall sensor to provide a magnetic flux measurement.

7. The apparatus of claim 5, wherein an output from said Hall sensor is adjusted with reference to an ambient temperature to provide a magnetic flux measurement.

8. The apparatus of claim 1, wherein said magnetic field varying member comprises a magnetically soft member supported for rotation about said rotational axis.

9. The apparatus of claim 1, including a cam member defining a cam surface in engagement with a follower member, and said magnetic field varying member is movable in said longitudinal direction in response to relative rotational movement between said cam member and said follower member.

10. The apparatus of claim 9, including a spring biasing said cam member into engagement with said follower.

11. The apparatus of claim 1, wherein said input shaft, output shaft, magnet and magnetic field varying member extend in a casing, and said sensor is mounted on said casing to a position adjusted relative to said magnetic field varying member.

12. The apparatus of claim 11, wherein said sensor is supported on a circuit board mounted to said casing.

13. The apparatus of claim 12, including a motor in driving engagement with said output shaft and FETs mounted to said circuit board for driving said motor.

14. The apparatus of claim 13 including a motor controller mounted to said circuit board for providing a control signal to said FETs.

15. A sensor apparatus for use in a steering system on a vehicle, comprising:
    an input shaft for receiving a steering input and rotating about a rotational axis;
    an output shaft for transmitting the steering input from said input shaft to a steered wheel assembly of a vehicle, said output shaft being rotationally movable relative to said input shaft;
    a torque transmitting member connected between said input shaft and said output shaft for transmitting a torque from said input shaft to said output shaft;
    a sensor providing an analog output voltage in response to a sensed magnetic field;
    a magnet located adjacent and in radially spaced relation to said sensor, said magnet being mounted in stationary non-rotating and non-translating relationship to said sensor; and
    a magnetic field varying member positioned in a magnetic field of said magnet between said magnet and said sensor, where said magnetic field varying member is movable to translate relative to said sensor and said magnet, and relative to said input shaft and said output shaft, in a longitudinal direction generally parallel to said rotational axis to vary a magnetic flux between said magnet and said sensor in response to relative movement between said input shaft and said output shaft.

16. The apparatus of claim 15, wherein said magnetic field varying member comprises a magnetically soft member supported for rotation about said rotational axis.

17. The apparatus of claim 15, including a cam member defining a cam surface in engagement with a follower member, and said magnetic field varying member is movable in said longitudinal direction in response to relative rotational movement between said cam member and said follower member.

18. The apparatus of claim 17, including a spring biasing said cam member into engagement with said follower.

19. The apparatus of claim 17, wherein said magnetic field varying member comprises a magnetically soft member and said sensor comprises a linear Hall sensor.

* * * * *